United States Patent
Danz et al.

(10) Patent No.: US 6,311,113 B1
(45) Date of Patent: Oct. 30, 2001

(54) CONTROL METHOD FOR ADJUSTING THE TRANSMISSION RATIO OF A CVT

(75) Inventors: Wolfgang Danz, Friedrichshafen; Andreas Piepenbrink, Meersburg; Andreas Schwenger, Friedrichshafen, all of (DE)

(73) Assignee: ZF Batavia, L.L.C., Batavia, OH (US)

( * ) Notice: Subject to any disclaimer, the term of this patent is extended or adjusted under 35 U.S.C. 154(b) by 0 days.

(21) Appl. No.: 09/505,096

(22) Filed: Feb. 16, 2000

(30) Foreign Application Priority Data

Feb. 25, 1999 (DE) .............................. 199 08 250

(51) Int. Cl.$^7$ .............................. F16H 61/00; F16H 59/00
(52) U.S. Cl. .................................. 701/57; 701/61; 474/28
(58) Field of Search .................. 701/57, 60, 61; 474/28, 18, 69

(56) References Cited

U.S. PATENT DOCUMENTS

| | | | |
|---|---|---|---|
| 4,710,879 | * 12/1987 | Vahbzadeh ............................. | 701/61 |
| 4,827,803 | * 5/1989 | Miyawaki .......................... | 701/61 X |
| 4,993,284 | * 2/1991 | Oshiage ............................. | 701/61 X |
| 5,009,127 | * 4/1991 | Morimoto et al. ................. | 701/61 X |
| 5,136,495 | * 8/1992 | Tokoro et al. .......................... | 701/61 |
| 5,366,416 | * 11/1994 | Roovers et al. ....................... | 474/18 |
| 5,906,649 | * 5/1999 | Genzel et al. ..................... | 701/61 X |
| 5,931,884 | * 8/1999 | Ochiai ................................ | 701/61 X |
| 5,967,918 | 10/1999 | Knapp et al. .......................... | 474/28 |

FOREIGN PATENT DOCUMENTS 196 06 311 A1  8/1997 (DE) .

* cited by examiner

Primary Examiner—Charles A Marmor
Assistant Examiner—Ankur Parekh

(74) Attorney, Agent, or Firm—Davis & Bujold, P.L.L.C.

(57) ABSTRACT

A method for ratio control for a continuously variable belt drive transmission with electrohydraulic control by means of a control loop with a linear PID controller with the theoretical ratio of the variator iv_theor. as command variable, the actual ratio iv as control variable and the ratio-change speed as correcting variable wherein the correcting variable delivered by the PID controller is limited to limit values subject to the design for an upshift and a downshift, a correction member is used which, taking into consideration internal and external system variables, corrects with the aid of a physicomathematical pattern the pattern error generated wherein to the equation based on the physicomathematical pattern $$k(iv) \cdot \frac{div}{dt} = p_2 \cdot A_2 \cdot k_p k_s - p_1 \cdot A_1 \quad \text{with:}$$

$k(iv)$ : ratio-dependent damping coefficient
$div/dt$ : variable gradient (ratio gradient)
$p_1$ : control pressure primary side
$p_2$ : control pressure secondary side
$A_1$ : pulley surface primary side
$A_2$ : pulley surface secondary side
$k_p k_s$ : adjusting force ratio a correction term $$\left.\frac{div}{dt}\right|_{theor.\ corr.}$$

is added and as standard for the ratio gradients the following equation is used:

$$\left.\frac{div}{dt}\right|_{theor.} = \frac{1}{k(iv)}(p_2 \cdot A_2 \cdot k_p k_s - p_1 \cdot A_1) + \left.\frac{div}{dt}\right|_{theor.corr.}$$

6 Claims, 2 Drawing Sheets

CONTROL METHOD FOR ADJUSTING THE TRANSMISSION RATIO OF A CVT

BACKGROUND OF THE INVENTION

The invention concerns a method for taking into consideration control errors in the control of the ratio of a continuously variable transmission with electrohydraulic control.

A continuously variable transmission usually consists, among others, of a startup unit, a forward/reverse drive unit, an intermediate shaft, a differential, hydraulic and electronic control devices and a variator. The variator usually comprises a primary and a secondary pulley, also called primary and secondary side, the two pulleys being formed by cone pulleys disposed in pairs, and is provided with a torque-transmitting wound-around element which rotates between the two cone pulley pairs.

In such a transmission the actual ratio is defined by the running radius of the wound-around element which, in turn, is a function of the axial position of the cone pulleys.

Compared with standard mechanical transmissions, continuously variable transmissions have, in general, subject to principle, one more degree of freedom, since in addition to the selection of the reduction step to be adjusted, it is also possible here to preset and control the variation speed at which the ratio is transmitted from one operation point to the other.

In continuously variable transmissions having a wound-around element (belt, chain) as torque-transmitting part, it results from the structural design that during the change of ratio the cone pulley pairs of primary and secondary side of the variator are alternatively and complementarily to each other moved apart and drawn together by adequate control elements whereby a change is produced of the running radius of the wound-around element on the cone pulleys and thus a change of ratio between primary and secondary side.

The variator is usually hydraulically controlled. The axial displacement of the cone pulleys means here a volume change which, since the adjustment develops under power or pressure control, must be compensated by the control hydraulics, by adequate flow rate changes in the respective cone pulley pair.

The change in flow rate to be adjusted by the electrohydraulic control depends here directly on the actual variable speed of the cone pulley pairs.

Since the control hydraulic system is, as a rule, supplied via an engine-torque dependent pump with constructionally preset maximal flow rate, there necessarily results also a constructionally stationary limit for the implementable adjustment dynamics of the variator. The variator can be adjusted only as quickly as admits the available oil flow rate in the interplay with other control and regulating loops or consumers.

In the design of the supply pump, together with the assurance of the needed oil flow rates, an essential part is also played by aspects, such as noise and efficiency, both of which negatively take effect as the size of the pump increases. The result of this is that for the structural design of the pump a compromise is implemented between the different criteria which in relation to the operation point and the individual criteria is only a less than optimal solution.

In relation to the adjustable variable speeds of the variator this means that operation states will always exist in which theoretically higher variable gradients would be possible as momentarily allowed by the actual availability of the oil flow rate.

The operation states are especially critical for a superposed control device, since the control without the transmitting medium oil does not act effectively on the behavior of the variator and thus on the setting of the ratio. The consequences are instabilities which can act as interfering oscillations of rotational speed until destroying the transmission mechanics.

One other aspect is formed by the limitations on the variator subject to the design (resistances of the parts, limit values for control pressures) which, to prevent the damage or even the destruction of the transmission mechanics, likewise must at every moment be taken into consideration.

A simple possibility of implementation would be to preset for the admissible variable gradients empirical limit values which are far enough from the critical values. The disadvantage here is that the possible adjustment potential in this case cannot be utilized to the extent required. Besides, a generalization regarding the safety in all operation states is hardly possible.

Within the scope of the development, the applicant has proposed a method which by means of a physicomathematical pattern continuously calculates in each operation state the actual limit values for the maximum possible variable gradients. Here are taken into consideration the special marginal conditions of oil supply and geometric ratios on the variator subject to the design.

The superposed control device for adjusting a preset theoretical value of the ratio additionally takes into consideration the limit values when generating the correcting variables.

As basis of this variable control serves a combination of physicomathematically pattern-based linearization of the control system with a linear PID controller. The correcting variable of the PID controller is directly interpreted as standard for the variable gradients to be set.

The physicomathematical pattern used is actuated on the input side with the variable-gradient theoretical values generated by the controller as correcting variable and generates therefrom the adequate control pressures for the variator. From the point of view of control technology, what is here concerned is a purely controlled cycle based on synchronizing to a sufficient extent pattern and reality.

In practice to a sufficient extent, this is true for the main controlled variable ratio (iv) whereas in relation to the variable gradients—especially in the dynamic case—partly strong divergences related to the operation point appear. The importance of the divergences increases when the above described limit values for the variable gradients, even if adhered to by the controller when calculating the correcting variable, the subsequent (controlled) conversion to pressure values nevertheless shows that the limit values were exceeded in reality.

Accordingly, it is further needed to compensate for divergences between pattern and reality in order to implement as much as possible the objective of operation of the transmission on the "safe side" in every operation point.

Therefore, the problem on which this invention is based is departing from the cited prior art to minimize with electrohydraulic control the error in the correcting variable of variable gradient in the ratio control of a continuously variable automatic transmission.

SUMMARY OF THE INVENTION

Accordingly, a control loop structure containing a physicomathematical pattern is proposed which has, in addition to the control elements known already, a feedback of the control error to the variable gradient. The additional feedback takes place via adequate control devices capable of compensating the divergences between pattern and reality. For this purpose, a correction member is introduced which takes into account the pattern error to be compensated.

The absolute divergence of the controlled variable from the theoretical value and the changes of speed and direction of said divergence are evaluated.

BRIEF DESCRIPTION OF THE DRAWINGS

The invention is explained in more detail herebelow with reference to the enclosed figures in which.

DESCRIPTION OF THE PREFERRED EMBODIMENTS

Figure 1:
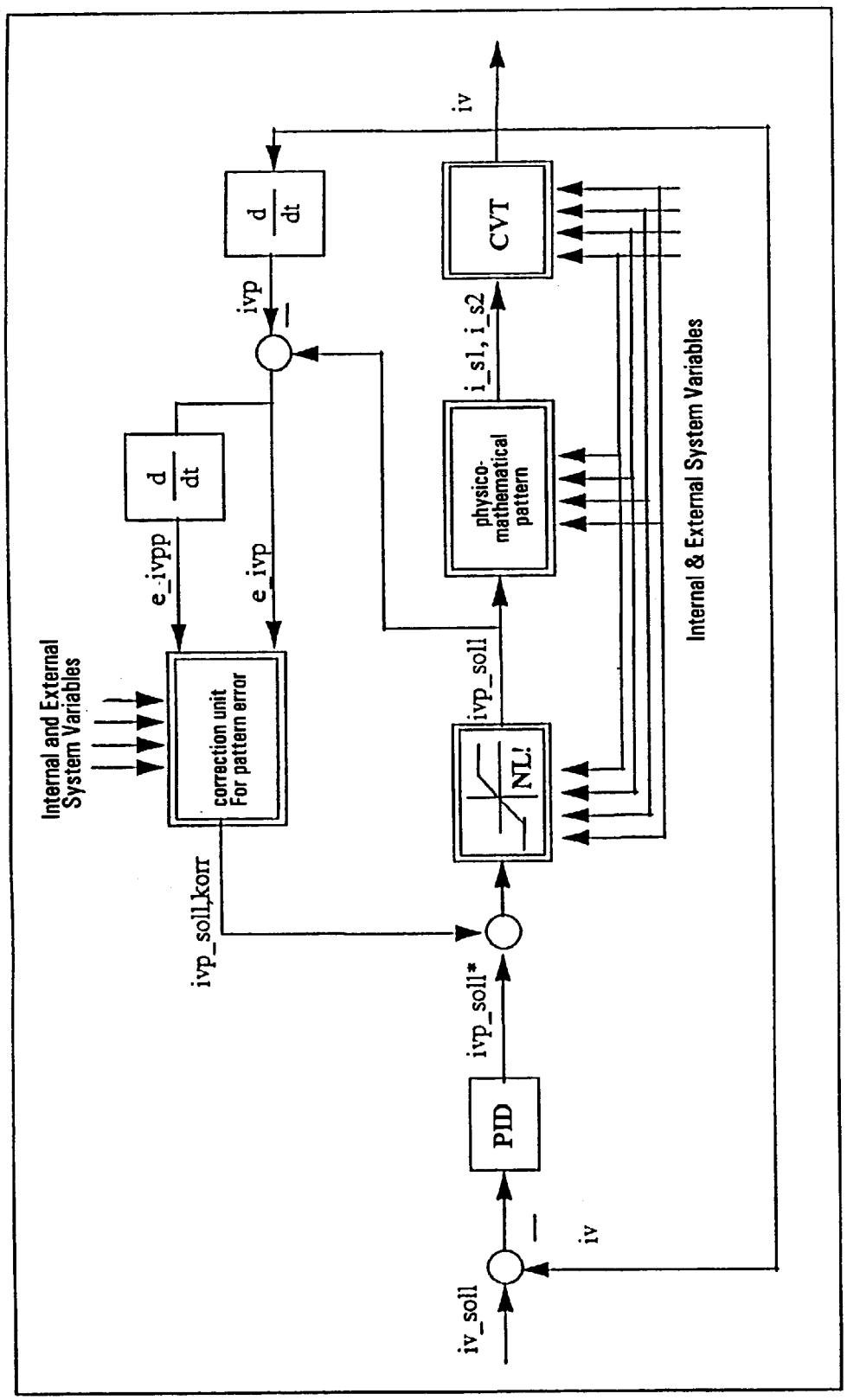
FIG. 1 which shows a block gear shift pattern of the control loop structure according to this invention.

According to FIG. 1, the control loop structure known from the prior art which contains a PID controller is used for a continuously variable belt drive transmission with the theoretical ratio iv_theor. as command variable, the actual ratio iv as controlled variable and the ratio-change speed as correcting variable. The control loop structure also contains a member which limits the correcting variable ratio-change speed delivered by the PID controller to limit values subject to the design. The limit values subject to the design are continuously calculated according to different internal and external parameters.

According to the invention, the control loop structure is enlarged by one other correction member which corrects the resulting pattern error taking into consideration internal and external system variables with reference to a physicomathematical pattern.

The equation on which the physicomathematical pattern is based reads:

$$k(iv) \cdot \frac{div}{dt} = p_2 \cdot A_2 \cdot k_p k_s - p_1 \cdot A_1 \text{ with:}$$

$k(iv)$ : ratio-dependent damping coefficient
$div/dt$ : variable gradient (ratio gradient)
$p_1$ : control pressure primary side
$p_2$ : control pressure secondary side
$A_1$ : pulley surface primary side
$A_2$ : pulley surface secondary side
$k_p k_s$ : adjusting force ratio According to the invention to the above equation is added a correction term $$\frac{div}{dt}\bigg|theor., corr(ivp\_theor.\_corr.)$$

The equation appearing herebelow is deduced as standard for ratio theoretical gradients:

$$\frac{div}{dt}\bigg|theor. = \frac{1}{k(iv)}(p_2 \cdot A_2 \cdot k_p k_s - p_1 \cdot A_1) + \frac{div}{dt}\bigg|theor.corr.$$

The additional term $$\frac{div}{dt}\bigg|theor. corr.$$

is the output of a correction member, according to the invention, which takes into account the pattern error to be compensated.

Herebelow are described two specially advantageous alternatives of the inventive method, both of which complement the already described control loop structure.

According to a first alternative of the invention, the correction member is based on methods of the fuzzy logic and uses setting rules such as are also exposed in a correction "by hand."

For this purpose the actual value of the ratio-change speed is compared with the theoretical value and the difference e_ivp is formed. Besides, the gradient of the ratio-change speed (ratio-change direction) e_ivpp relative to the theoretical value is determined by differentiation.

The farther removed the actual value of the ratio gradient to be set from the required theoretical value and depending on the motion direction (to the theoretical value or from the theoretical value) and on the motion speed of the ratio gradient, an adequate, proportionally acting correction value is calculated and applied.

The following table illustrates one such control mechanism:

|       |                       | E_ivp                  |       |                      |
|-------|-----------------------|------------------------|-------|----------------------|
|       |                       | NEGATIVE VERY GREAT    | ZERO  | POSITIVE VERY GREAT  |
|       | POSITIVE VERY GREAT   | 0                      | 50    | 100                  |
| E_ivpp| ZERO                  | −50                    | 10    | 50                   |
|       | NEGATIVE VERY GREAT   | −100                   | −50   | 0                    |

Each field of the table represents one rule with two premises each. The control conclusion when the premises prove correct is shown by the plotted numeric value (singleton).

EXAMPLE

WHEN E_ivp positive very great AND E_ivpp negative very great

THEN correction value zero (0%)

The above example illustrates the case when a great positive control difference exists whereas the controlled variable runs very quickly toward the theoretical value so that no correction has to be made.

The example that follows illustrates the inventive method for the case of great positive control difference. Here no change of the controlled variable is detectable (that is, the gradient of the ratio-change speed is 0 so that a careful correction interference is effected in order to drive the controlled variable in direction of the theoretical value.

EXAMPLE 2

WHEN e_ivp positive very great AND E_ivpp zero,

THEN correction value positive medium (50%)

The control premises are evaluated by "fuzzy sets" which represent the information of the premises as "diffused amount."

Figure 2:
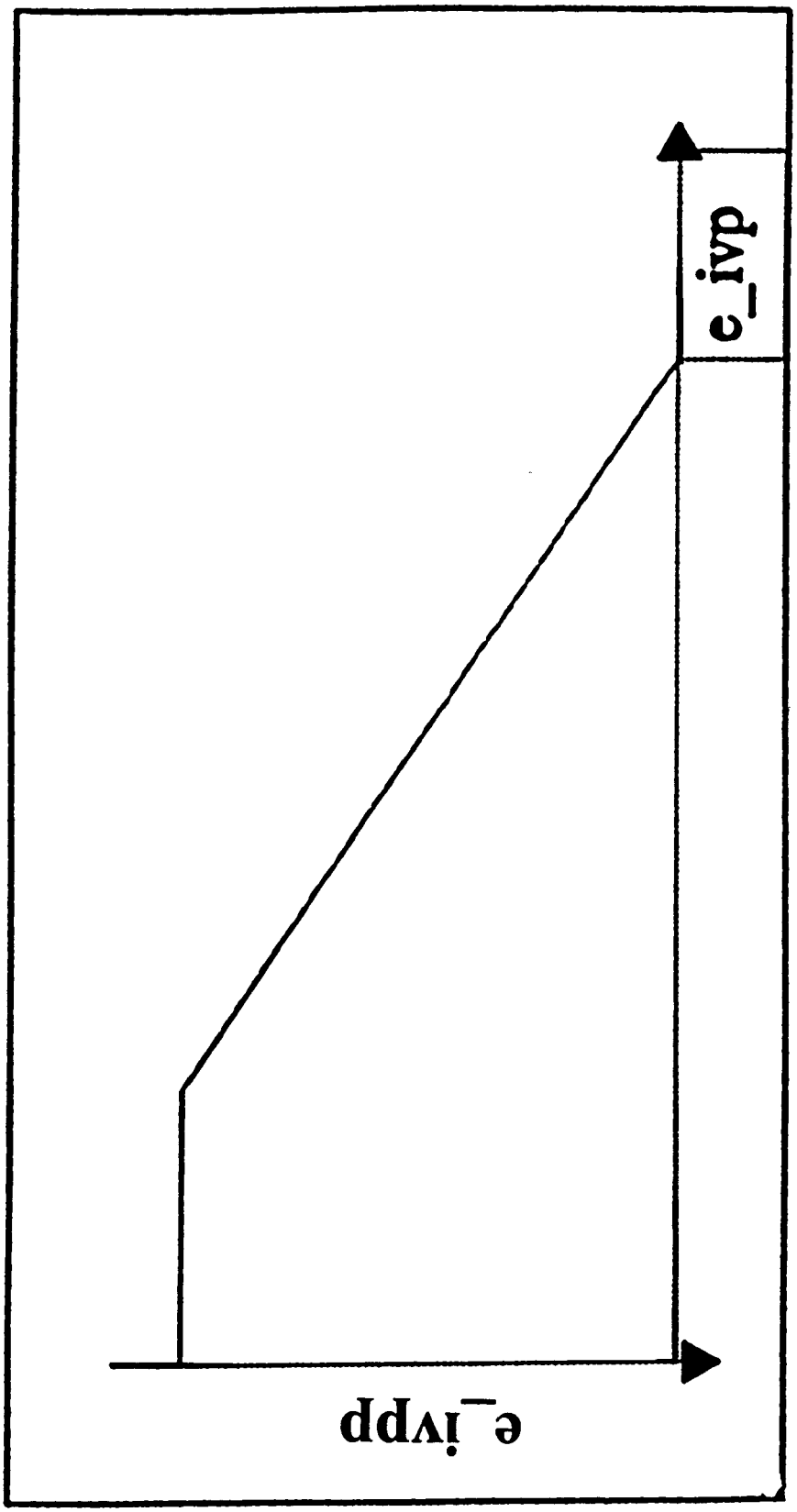
FIG. 2 is a graph of an example of a fuzzy logic control mechanism.

EXAMPLE e_ivp negative very great as shown in FIG. 2.

The fuzzy logic control mechanism shown works with all the methodical means known from the foundations of the fuzzy logic and which contribute optimally to adapt the control mechanism to the problem posed:

adjustable evaluation of each separate rule (composition);

adjustable operators for linking the premise members (aggregation) and adjustable operators for summarizing the total result (inference).

According to the invention, the numeric range of the singletons is kept between +100 and −100 (%). By this standardization, it is possible, in combination with a scaling rear-mounted on the control mechanism, to maintain the latter in its qualitative basic tuning and only by adapting the scale factors to carry it to different transmissions whereby the expense for tuning is considerably reduced.

For generalizing the basic control mechanism shown, the input variables are passed over special filter steps which, together with an adjustable high-stop filtering of the raw signals, also produce a standardization of the value range (−100% . . . +100%).

For better adaptation of the correction interference to the actual operation point, it is possible, according to the invention, to use added internal and external signals.

Within the scope of one other alternative of the inventive method, the resting position (E_ivp=0 AND E_ivpp=0) of the ratio gradient is additionally linked with the absolute control difference of the main control loop (controlled variable iv).

This brings about that during detectable change of the control difference of the main control loop, the start from the resting position (E_ivp=0 AND E_ivpp=0) of the ratio gradient be accelerated whereby a better follow-up behavior is obtained.

For this purpose the fuzzy control mechanism already described is complemented by addition of the following rules:

|  |  | E_ivp = AND E_ivpp = 0 ACTIVE |
|---|---|---|
|  | POS. GREAT | 100 |
| iv_theor.-iv_actual | ZERO | 50 |
|  | NEG. GREAT | −100 |

The singleton value of 50 (%) when lv_theor.−iv_act=zero, prevents that in the dynamic approximation to the ratio theoretical value of the ratio gradient, the braking is not too hard, which would be the case with a singleton value of 0.

One other acceleration out of the resting position is obtained by introducing a load signal (for example, accelerator pedal or throttle valve) in the control mechanism in a manner such as to induce a derivative reaction of the correction interference.

What is claimed is:

1. Method for ratio control for a continuously variable belt drive transmission with electrohydraulic control by means of a control loop having a linear PID controller with the theoretical ratio of the variator (iv_theor.) as command variable, the actual ratio iv as control variable and the ratio-change speed as correcting variable wherein the correcting variable delivered by the PID controller is limited to limit values subject to the design for an upshift and a downshift, characterized in that a correction member is used which, taking into consideration internal and external system variables, corrects the generated pattern error with the aid of a physicomathematical pattern wherein to the equation based on the physicomathematical pattern $$k(iv) \cdot \frac{d\,iv}{dt} = p_2 \cdot A_2 \cdot k_p k_s - p_1 \cdot A_1 \quad \text{with:}$$

| $k(iv)$ | : | ratio-dependent damping coefficient |
|---|---|---|
| $d\,iv/dt$ | : | variable gradient (ratio gradient) |
| $p_1$ | : | control pressure primary side |
| $p_2$ | : | control pressure secondary side |
| $A_1$ | : | pulley surface primary side |
| $A_2$ | : | pulley surface secondary side |
| $k_p k_s$ | : | adjusting force ratio | a correction term $$\left.\frac{d\,iv}{dt}\right|_{theor.\ corr}$$

is added and as standard for the ratio gradients the following equation is used:

$$\left.\frac{d\,iv}{dt}\right|_{theor.} = \frac{1}{k(iv)}(p_2 \cdot A_2 \cdot k_p k_s - p_1 \cdot A_1) + \left.\frac{d\,iv}{dt}\right|_{theor.corr.}$$

2. Method according to claim 1, characterized in that said correction member as input variable uses the difference between the theoretical value and the actual value of the ratio-change speed e_ivp and the gradient of said difference e_ivpp, and that the output signal is a correction value which is proportional to the sign subjected variables e_ivp and e_ivpp and is produced by means of a fuzzy, logical control mechanism.

3. Method according to claim 2, characterized in that the following control mechanism has been used wherein each field of the table represents one rule with two premises each and the control conclusion is shown when the premises agree by the plotted numeric value (singleton) and the control premises are evaluated by "fuzzy sets":

|  |  | E_ivp | | |
|---|---|---|---|---|
|  |  | NEGATIVE VERY GREAT | ZERO | POSITIVE VERY GREAT |
| E_ivpp | POSITIVE VERY GREAT | 0 | 50 | 100 |
|  | ZERO | −50 | 10 | 50 |
|  | NEGATIVE | −100 | −50 | 0 |

|  | E_ivp | | |
|---|---|---|---|
|  | NEGATIVE VERY GREAT | ZERO | POSITIVE VERY GREAT |
| VERY GREAT. |  |  |  |

4. Method according to claim 3, characterized in that the numeric range of the singleton is kept between +100 and −100.

5. Method according to claim 2, characterized in that for generalization of the control mechanism the input variables are passed over special filter steps so that a high-stop filtering is carried out.

6. The method according to claim 2, wherein the resting position (E_ivp=0 AND E_ivpp=0) of the ratio gradient is linked with the absolute control difference of the main control loop so that when change of the control difference of the main control loop is detectable, the start out of the resting position (E_ivp=0 AND E_ivpp=0) of the ratio gradient is accelerated whereby a better follow-up behavior is achieved wherein the control mechanism is complemented by adding the following rules:

|  |  | E_ivp = 0 AND E_ivpp = 0 ACTIVE |
|---|---|---|
| Iv_THEOR-iv_ACTUAL | POS. GREAT | 100 |
|  | ZERO | 50 |
|  | NEG. GREAT | −100. |

\* \* \* \* \*